(12) United States Patent
Esposito et al.

(10) Patent No.: US 10,533,590 B2
(45) Date of Patent: *Jan. 14, 2020

(54) CONNECTOR FOR CONCRETE BARRIERS

(71) Applicant: JCNY Industries, Inc., Putnam Valley, NY (US)

(72) Inventors: Joseph Esposito, Putnam Valley, NY (US); Carlos A. Casal, Yonkers, NY (US)

(73) Assignee: JCNY Industries, Inc., Putnam Valley, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,736

(22) Filed: Dec. 18, 2017

(65) Prior Publication Data

US 2018/0106283 A1 Apr. 19, 2018

Related U.S. Application Data

(63) Continuation of application No. 14/519,917, filed on Oct. 21, 2014, now Pat. No. 9,897,123.

(Continued)

(51) Int. Cl.
*F16B 9/02* (2006.01)
*E01F 13/02* (2006.01)
(Continued)

(52) U.S. Cl.
CPC .............. *F16B 9/023* (2013.01); *E01F 9/669* (2016.02); *E01F 13/022* (2013.01);
(Continued)

(58) Field of Classification Search
CPC ....... E01F 13/00; E01F 15/025; E01F 15/083; E01F 15/088; E01F 7/045; E01F 9/658;
(Continued)

(56) References Cited

U.S. PATENT DOCUMENTS 1,553,785 A 9/1925 Ley
3,958,890 A 5/1976 Ferrari
(Continued)

FOREIGN PATENT DOCUMENTS

EP 1561864 A1 8/2005
EP 2468958 A1 6/2012

OTHER PUBLICATIONS

International Search Report issued in International Application No. PCT/US14/61581 dated Jan. 21, 2015.

*Primary Examiner* — Theodore V Adamos (74) *Attorney, Agent, or Firm* — Hoffmann & Baron, LLP (57) ABSTRACT

Provided are a connector and a connection system for concrete barriers. The connector is configured to slip-fit into a cross-shaped gap formed between the concrete barriers. The connector includes a saddle member and a fork member. The saddle member includes a base plate and peripheral plates. The peripheral plates extend at angles from the base plate to define a channel extending along the length of the base plate. The fork member extends from the base plate of the saddle member. The fork member includes an elongated base, flanges, and legs. The elongated base extends in the channel between the peripheral plates at least along the width of the base plate. The flanges are transverse to the elongated base forming a cross-shaped structure disposed in the channel with the flanges that extend toward the open ends of the channel. The legs extend separately from the elongated base.

16 Claims, 7 Drawing Sheets

Related U.S. Application Data (60) Provisional application No. 61/893,608, filed on Oct. 21, 2013.

(51) Int. Cl.
  *E01F 15/08* (2006.01)
  *E01F 9/669* (2016.01)
  *F16B 5/00* (2006.01)

(52) U.S. Cl.
  CPC .......... *E01F 15/083* (2013.01); *E01F 15/088* (2013.01); *F16B 5/0036* (2013.01); *Y10T 403/70* (2015.01)

(58) Field of Classification Search
  CPC . E01F 9/669; E01F 9/673; E01F 9/677; E01F 9/681; E01F 13/022; F16B 9/02; F16B 9/023; F16B 13/02
  USPC .................... 256/13.1, 7; 404/6, 9; 403/292; 52/396.04, 396.09, 396.08, 284, 285.3; 248/534
  See application file for complete search history.

(56) References Cited

U.S. PATENT DOCUMENTS

| | | | |
|---|---|---|---|
| 4,054,268 A * | 10/1977 | Sher | .................... E04F 11/1812 256/24 |
| 4,249,832 A | 2/1981 | Schmanski | |
| 4,338,041 A | 7/1982 | Schmanski | |
| 4,498,803 A | 2/1985 | Quittner | |
| 4,661,010 A | 4/1987 | Almer et al. | |
| 4,685,656 A | 8/1987 | Lee et al. | |
| 4,837,993 A * | 6/1989 | Studenski | ................. E06B 3/02 52/208 |
| 4,887,691 A | 12/1989 | Rotondo | |
| 4,954,009 A | 9/1990 | Kellison | |
| 5,015,119 A | 5/1991 | Schmanski | |
| 5,186,438 A | 2/1993 | Cross et al. | |
| 5,190,394 A | 3/1993 | Mallon et al. | |
| 5,244,172 A | 9/1993 | Allega | |
| 5,295,757 A | 3/1994 | Ivey et al. | |
| 5,685,665 A | 11/1997 | Lembo | |
| 5,689,927 A | 11/1997 | Knight, Sr. | |
| 5,975,500 A | 11/1999 | Orton et al. | |
| 7,036,799 B2 | 5/2006 | Shepherd | |
| 7,069,680 B1 | 7/2006 | Crawford | |
| 7,168,882 B1 | 1/2007 | Owen | |
| 7,730,677 B2 | 6/2010 | Hansen | |
| 8,206,056 B2 | 6/2012 | O'Banion et al. | |
| D695,592 S | 12/2013 | White | |
| D701,107 S | 3/2014 | White | |
| 2004/0197140 A1 | 10/2004 | Maleska | |
| 2008/0307684 A1 | 12/2008 | Ulloa et al. | |
| 2009/0297263 A1 | 12/2009 | Redlberger et al. | |
| 2010/0225040 A1 * | 9/2010 | Allen | .................. E04F 11/1851 269/297 |
| 2013/0185971 A1 | 7/2013 | Mandl et al. | |
| 2014/0014798 A1 | 1/2014 | Allen | |

* cited by examiner

CONNECTOR FOR CONCRETE BARRIERS

CROSS REFERENCE TO RELATED APPLICATION

This application is a continuation of U.S. patent application Ser. No. 14/519,917, filed on Oct. 21, 2014, which claims benefit of U.S. Provisional Patent Application No. 61/893,608, filed on Oct. 21, 2013, the contents of which are incorporated herein by reference in their entirety.

BACKGROUND

Field

The present application relates to concrete barriers. More specifically, the present application is directed to a connector and connection system to provide improved connection for various peripheral devices to the concrete barriers.

Brief Discussion of Related Art

A variety of modular concrete barrier systems (e.g., Jersey barrier systems) have been employed to separate lanes of traffic, re-route traffic especially during construction, provide crowd control at various events, as well as other applications. These systems are commonly used for temporary and in some cases semi-permanent applications.

One type of a modular concrete system is known as a J-J hooks concrete barrier system, which includes a plurality of concrete barriers. Adjacent concrete barriers lock with respect to one another using J-type connectors (hooks) disposed along the sidewalls of the concrete barriers. The J-J hooks concrete barrier system provides a self-aligning, easily modifiable and/or removable system. Specifically, an independent concrete barrier can be removed without disturbing the concrete barriers adjacent to that concrete barrier. Moreover, the barriers can be easily moved/adjusted in a desired direction.

The industry currently uses costly methods to attach various peripheral devices (e.g., lighting, fencing, and signage) to the concrete barriers. Generally, the barriers are drilled to attach saddle-mounted units for lighting, fencing, signage, and/or other applications. On average, at least four (4) anchors (e.g., bolts) are required to attach the saddle of the unit to the concrete barrier. Moreover, two (2) mechanics are required to attach and/or remove each unit.

It is therefore desirable to provide a connector and connection system to provide improved connection for various peripheral devices to the concrete barriers, reducing costs associated with their attachment and removal.

SUMMARY

In accordance with an embodiment, there is disclosed a connector to slip-fit into a cross-shaped gap formed between concrete barriers. The connector includes a saddle member and a fork member.

The saddle member includes a base plate and peripheral plates. The base plate has a width and a length. The peripheral plates extend at angles from the base plate to define a channel extending along the length of the base plate. The channel has an open bottom and open ends.

The fork member extends from the base plate of the saddle member. The fork member includes an elongated base, flanges, and legs. The elongated base extends in the channel between the peripheral plates at least along the width of the base plate. The flanges are transverse to the elongated base forming a cross-shaped structure disposed in the channel with the flanges extending toward the open ends of the channel along the length of the base plate. The legs extend separately from the elongated base through the open bottom of the channel.

In accordance with another embodiment, there is disclosed a connection system that includes concrete barriers and a connector.

The concrete barriers include slots through sidewalls that terminate the concrete barriers. The sidewalls of the concrete barriers are disposed in relation to each other such that a cross-shaped gap is formed between the concrete barriers, the gap defined by the sidewalls and the slots. The concrete barriers are engageable by a lock that extends in the gap between the concrete barriers.

The connector is slip-fit into the gap between concrete barriers. The connector includes a saddle member and a fork member.

The saddle member includes a base plate and peripheral plates. The base plate has a width and a length. The peripheral plates extend at angles from the base plate to define a channel extending along the length of the base plate. The channel has an open bottom and open ends.

The fork member extends from the base plate of the saddle member. The fork member includes an elongated base, flanges, and legs. The elongated base extends in the channel between the peripheral plate at least along the width of the base. The flanges transverse to the elongated base forming a cross-shaped structure disposed in the channel with the flanges extending toward the open ends of the channel along the length of the base plate. The legs extend separately from the elongated base through the open bottom of the channel.

The connection system can also include a peripheral device connectable to the connector. The peripheral device can be a light device, a sign device, or a fence device. The peripheral device can also include an extension pole and a device. The device can extend in relation to the extension pole. The device can be a light fixture, a sign, or a fence.

In accordance with a further embodiment, there is disclosed a connector to slip-fit into a cross-shaped gap formed between concrete barriers. The connector includes a saddle member and a fork member.

The saddle member includes a base plate and peripheral plates. The peripheral plates extend at angles from the base plate to define open ends of the saddle member.

The fork member extends from the base plate of the saddle member. The fork member includes an elongated base, flanges, and legs. The elongated base extends between the peripheral plates. The flanges are transverse to the elongated base forming a cross-shaped structure with the flanges extending toward the open ends of the saddle member. The legs extend separately from the elongated base.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which.

DETAILED DESCRIPTION

A connector and a connection system to provide improved connection for various peripheral devices to the concrete barriers are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
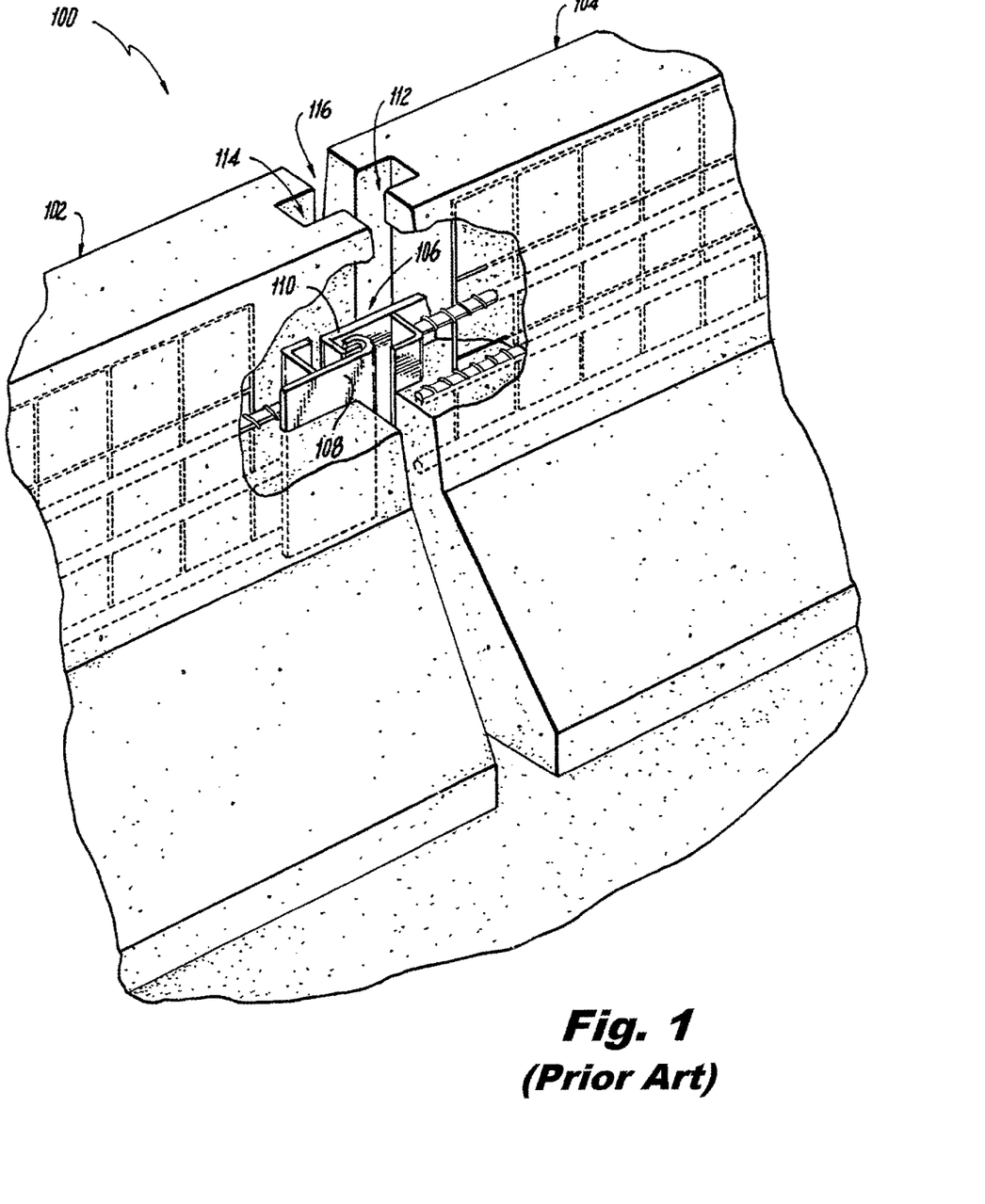
FIG. 1 illustrates an example modular concrete barrier system.

FIG. 1 illustrates a modular concrete barrier system 100. The system 100 can be a J-J hooks concrete barrier system or another concrete barrier system providing a modularized concrete barrier structure. The system 100 includes a plurality of concrete barriers, such as concrete barriers 102, 104. Only one pair of concrete barriers 102, 104 is shown to provide understanding, yet reduce complexity. Multiple concrete barriers can be provided in the system 100.

Each pair of concrete barriers 102, 104 includes a lock 106 and slots 112, 114 along the sidewalls. The lock 106 removeably secures the barriers 102, 104 in relation to one another. The lock 106 includes reciprocally positioned J-type connectors (hooks) 108, 110 disposed along the sidewalls of the concrete barriers 102, 104. Reciprocal connectors 108, 110 can engage one another to secure the concrete barrier 102 in relation to the concrete barrier 104.

The slots 112, 114 extend along the sidewalls of the concrete barriers 102, 104 such that the concrete barriers 102, 104 can be disposed abutting one another, in which case the reciprocal connectors 108, 110 are inserted at least partially into the slots 112, 114. When the reciprocal connectors 108, 110 are engaged, a gap 116 is defined between the concrete barriers 102, 104 and the slots 112, 114.

Figures 2, 3:
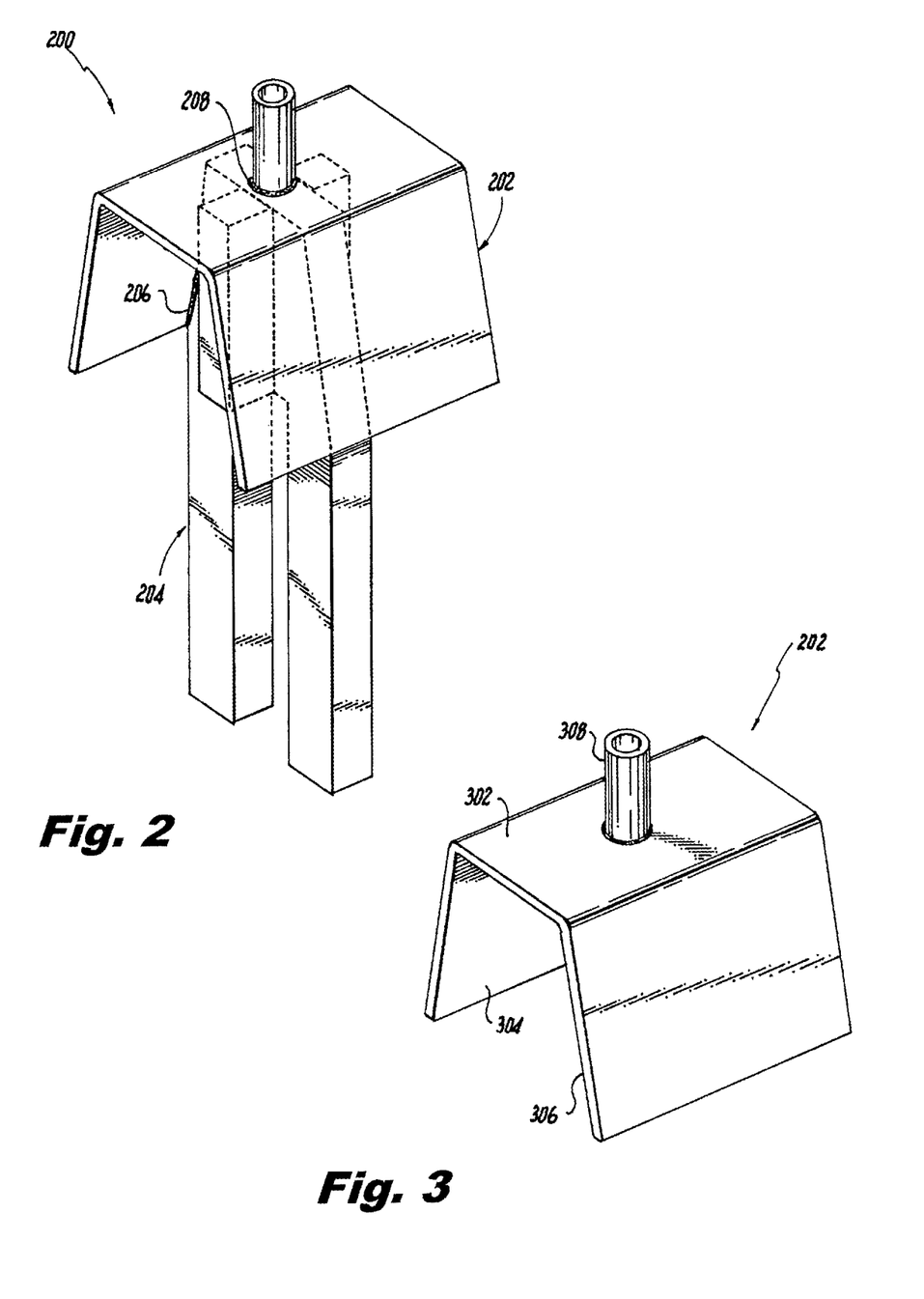
FIG. 2 illustrates a side view of an example connector that can slip-fit into a gap formed between concrete barriers of the concrete barrier system illustrated in FIG. 1.
FIG. 3 illustrates a side view of an example saddle member of the connector illustrated in FIG. 2.

FIG. 2 illustrates a side view of an example connector 200. The connector 200 is configured to be disposed in the gap 116 between the concrete barriers 102, 104 of the system 100 to provide a connection that is simple to make yet provides a rugged and durable connection for one or more peripheral devices (e.g., lighting, fencing, and signage) to the concrete barriers 102, 104 of the system 100.

The connector 200 is provided with a slip-fit connection that slides into the gap 116 (cross-like gap) created by the barriers 102, 104 of the system 100. The connector 200 includes a saddle member 202 and a fork member 204. The connector 200 can be cast in one piece, or can be cast in several pieces that are welded together at seams 206, 208, for example. The saddle member 202 is described in greater detail with reference to FIG. 3, while the fork member 204 is described in greater detail with reference to FIG. 4.

At this point it is sufficient to mention that—as the connector 200 is slip-fit into the gap 116—the saddle member 202 is disposed over the gap 116 and partially atop each of the concrete barriers 102, 104. Moreover, the fork member 204 slides into the gap 116 and is disposed atop the lock 106 and straddles the lock 106 (e.g., reciprocal connectors 108, 110). This provides a simple yet rugged and durable connection to the concrete barriers 102, 104 of the system 100.

FIG. 3 illustrates a side view of an example saddle member 202 of the connector 200. The saddle member 202 includes a base plate 302, peripheral plates 304, 306, and connector sleeve 308.

The base plate 302 is configured to be disposed over the gap 116 and partially atop each of the concrete barriers 102, 104. The peripheral plates 304, 306 extend below the base plate 302 and are configured to extend at least partially along the front and back walls of the concrete barriers 102, 104.

As illustrated, the peripheral plates 304, 306 are angled with respect to one another and outwardly from the base plate 302 to accommodate the sloping configuration of the front and back walls of the concrete barriers 102, 104 over which the saddle member 202 is disposed. The angulation of the peripheral plates 304, 306 can be adjusted depending on the configuration of the front and back walls of the concrete barriers 102, 104. For example, the peripheral plates 304, 306 can be parallel for certain configurations of the concrete barriers 102, 104 where the front and back walls of the concrete barriers 102, 104 are parallel.

The connector sleeve 308 is configured to connect to extension poles for various peripheral devices, e.g., lighting, fencing, and signage. Examples of these peripheral devices are described in greater detail with reference to FIGS. 7-9.

Figures 4, 5:
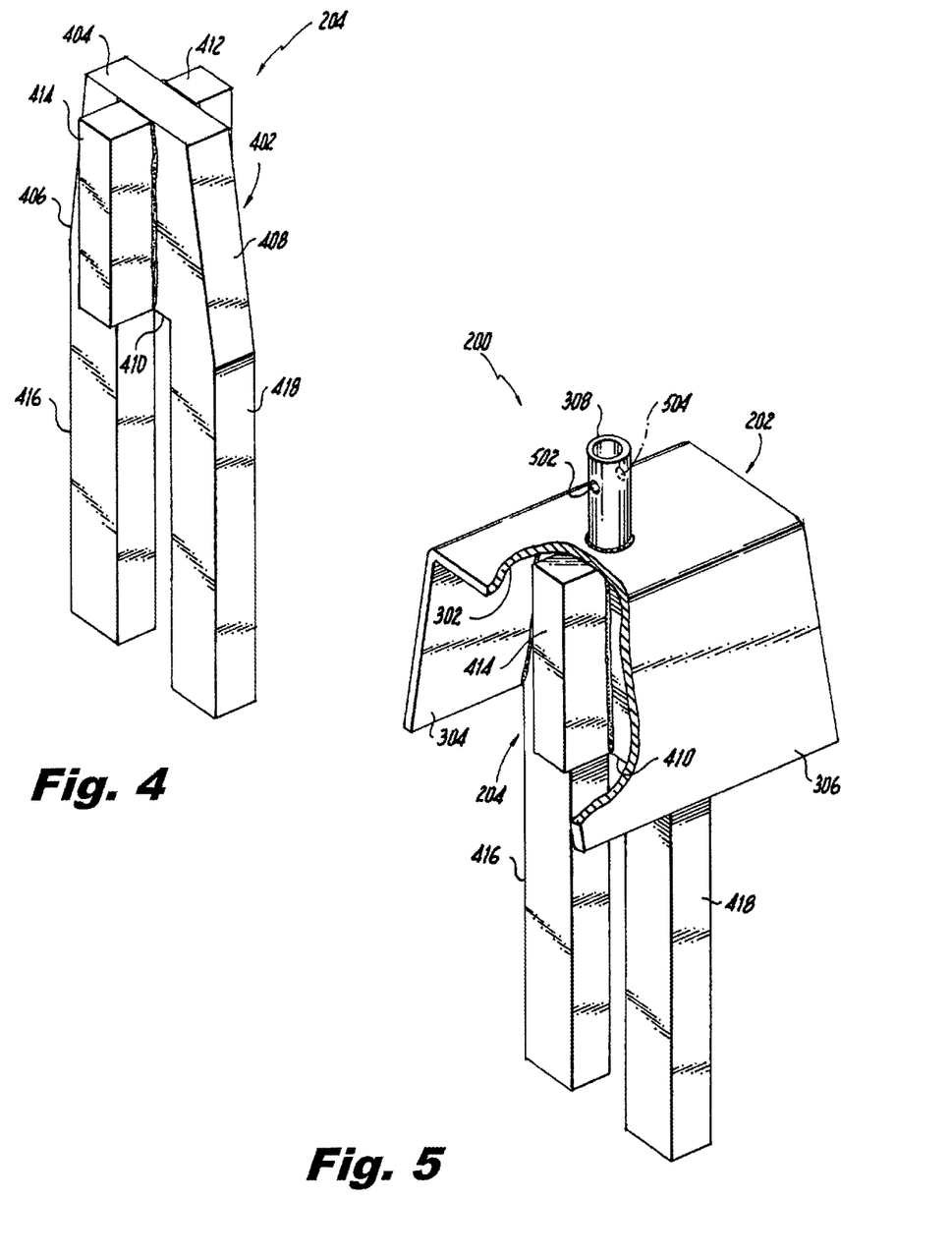
FIG. 4 illustrates a perspective view of an example fork member of the connector illustrated in FIG. 2.
FIG. 5 illustrates a perspective view of the example connector illustrated in FIG. 2.

FIG. 4 illustrates a perspective view of an example fork member 204 of the connector 200. The fork member 204 includes a base member 402, flanges 412, 414, and legs 416, 418.

The base 402 includes an elongated top 404, bottom 410, and sloping sides 406, 408. The elongated top 404 and bottom 410 can be planar. The angulation of the sides 406, 408 with respect to the elongated top 404 of the fork member 204 matches the configuration of the peripheral plates 304, 306 with respect to the base plate 302 of the saddle member 202.

The flanges 412, 414 extend transversely to the elongated top 404 and bottom 410 of the base 402. The flanges 412, 414 are sized and dimensioned to extend into the slots 112, 114 of the concrete barriers 102, 104. The top and bottom of the flanges 412, 414 can be co-planar with respect to the top 404 and bottom 410, respectively. The bottom 410 of the base 402 and the bottoms of the flanges 412, 414 can thus be disposed in a planar configuration atop the lock 106. The configuration of the bottom 410 and the bottoms of the flanges 412, 414 can be adjusted with respect to a different lock between the concrete barriers 102, 104.

The legs 416, 418 extend below the base 402 and are to be disposed along the height of the gap 116. For example, the length of the legs 416, 418 can approximate the height from the bottom of the concrete barriers 102, 104 up to the top of the lock 106, such that the legs can straddle the lock 106.

FIG. 5 illustrates a perspective view of the example connector 200. As described hereinabove, the connector 200 can slip-fit into the gap 116. The connector 200 can thus eliminate the need for drilling and anchoring into the concrete barriers 102, 104. Moreover, the connector 200 can be placed by one mechanic, not two as in the case of a conventional unit. Accordingly, the connector 200 reduces labor cost involved with the installation and removal of the connectors in relation to the concrete barriers 102, 104.

As illustrated in FIG. 5, the connector sleeve 308 can include openings 502, 504 to receive connector bolts to secure a reciprocal portion of an extension pole inside the connector sleeve 308. As described hereinabove, the extension poles can be utilized for various peripheral devices, e.g., lighting, fencing, and signage.

Examples of these peripheral devices are described in greater detail with reference to FIGS. 7-9. While the connector sleeve 308 is shown to be tubular and having a round cross-section, various connectors having other cross-sections can be provided, such as a hexagonal cross-section (e.g., locking cross-section). In such connectors, opening 502 and/or opening 504 can be provided to secure a reciprocal portion of an extension pole inside the connector sleeve 308.

Figure 6:
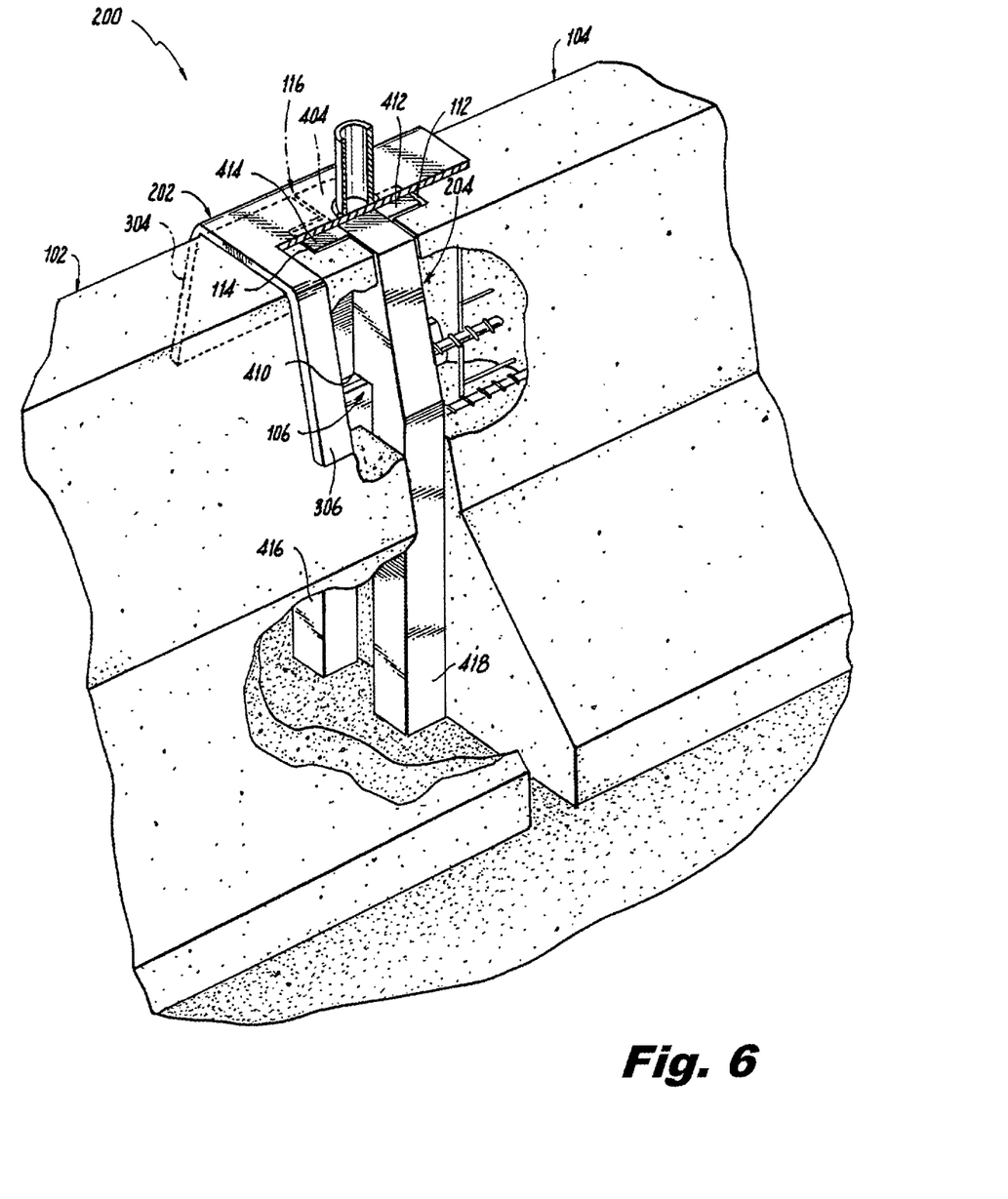
FIG. 6 illustrates a perspective view of the example connector disposed in a gap formed between concrete barriers of the concrete barrier system illustrated in FIG. 1.

FIG. 6 illustrates a perspective view of the example connector 200 disposed in the gap 116 formed by concrete barriers 102, 104. For clarity purposes of the connection between the connector 200 and the concrete barriers 102, 104, the saddle member 202 is shown transparent in part and cut-away in part, and the concrete barrier 102 is shown cut-away in part.

The connector 200 is slip-fit into the gap 116. Accordingly, the saddle member 202 is disposed over the gap 116 and partially atop each of the concrete barriers 102, 104. The fork member 204 slides into the gap 116 and straddles the lock 106. This provides a simple yet rugged and durable connection to the concrete barriers 102, 104 of the system 100.

Specifically, the flanges 412, 414 extend into the slots 112, 114 of the concrete barriers 102, 104. In the gap 116, the bottom 410 of the base 402 and bottoms of the flanges 412, 414 are thus disposed in a planar configuration atop the lock 106, while the legs 416, 418 straddle the lock 106 and extend along the height of the concrete barriers 102, 104.

Figure 7:
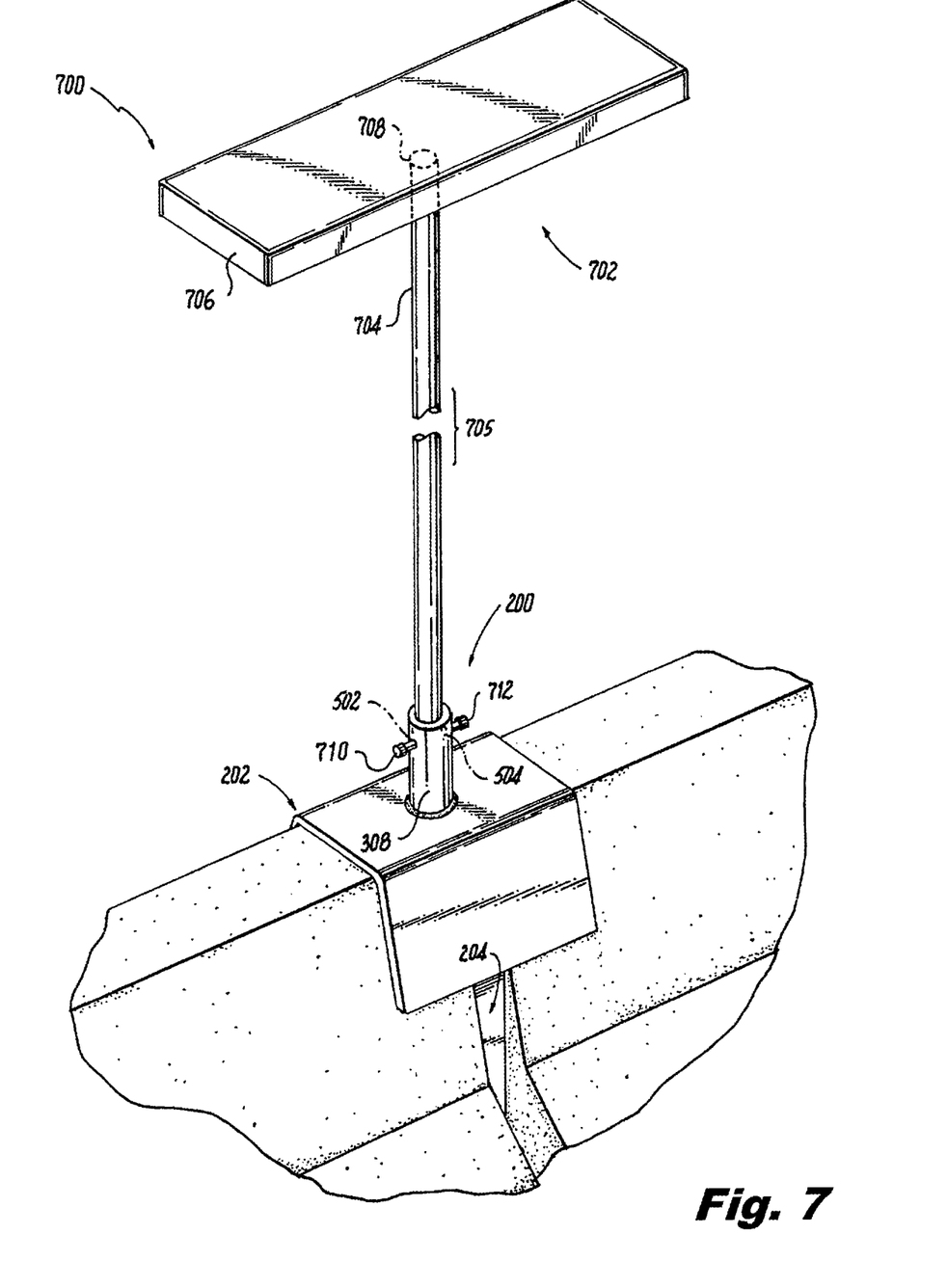
FIG. 7 illustrates a perspective view of a lighting connection system that includes the connector of FIG. 2.

FIG. 7 illustrates a perspective view of a lighting connection system 700. The system 700 includes a connector 200 and a lighting peripheral device 702. The lighting peripheral device 702 includes an extension pole 704 and a lighting fixture 706.

The extension pole 704 is sized and dimensioned to fit into the connector sleeve 308 or over a connector rod (not shown). One or more connectors 710, 712 (e.g., bolts) engage the extension pole 704 to secure the extension pole 704 in relation to the connector sleeve 308. Similarly, the extension pole 704 can fit over the connector rod and be secured by the one or more connectors 710, 712. Extension poles of different heights can be provided for various lighting applications, as indicated by the break 705 along the height of extension pole 704.

The lighting fixture 706 is secured or mounted to the extension pole 704. For example, the lighting fixture 706 is welded at 708 to the extension pole 704. Various other connections of the lighting fixture 706 to the extension pole 704 can be provided.

Figure 8:
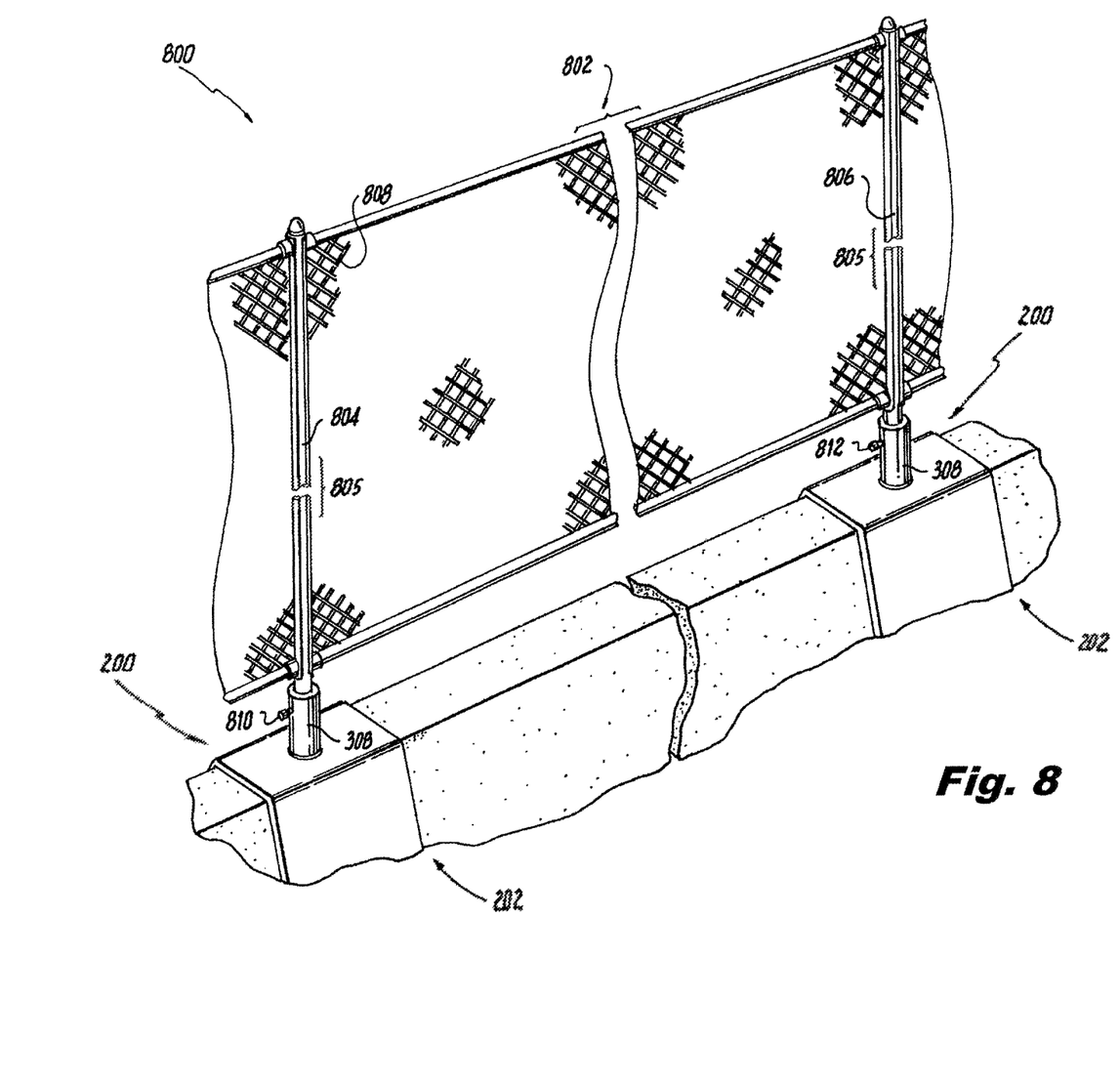
FIG. 8 illustrates a perspective view of a fencing connection system that includes the connector of FIG. 2.

FIG. 8 illustrates a perspective view of a fencing connection system 800. The system 800 includes connectors 200 and a fencing peripheral device 802. The fencing peripheral device 802 includes extension poles 804, 806 and fencing 808.

The extension poles 804, 806 are sized and dimensioned to fit over the connector rods or into the connector sleeves 308 of respective connectors 200, which can be disposed in several gaps 116 formed between pairs of concrete barriers, one of which pairs (concrete barriers 102, 104) is illustrated in FIG. 1. Similarly, one or more connectors 810, 812 (e.g., bolts) engage the extension poles 804, 806 to secure the extension poles 804, 806 in relation to the connector rods or connector sleeves 308 of the respective connectors 200. The height of the poles 804, 806 can be adjusted based on the fencing applications, as indicated by break 805 along heights of the poles 804, 806.

The fencing 808 can be attached to the extension poles 804, 806 in a conventional or yet to be developed manner. Moreover, the fencing 808 can be replaced with a canopy (not shown), which can be provided over rows of concrete barriers.

Figure 9:
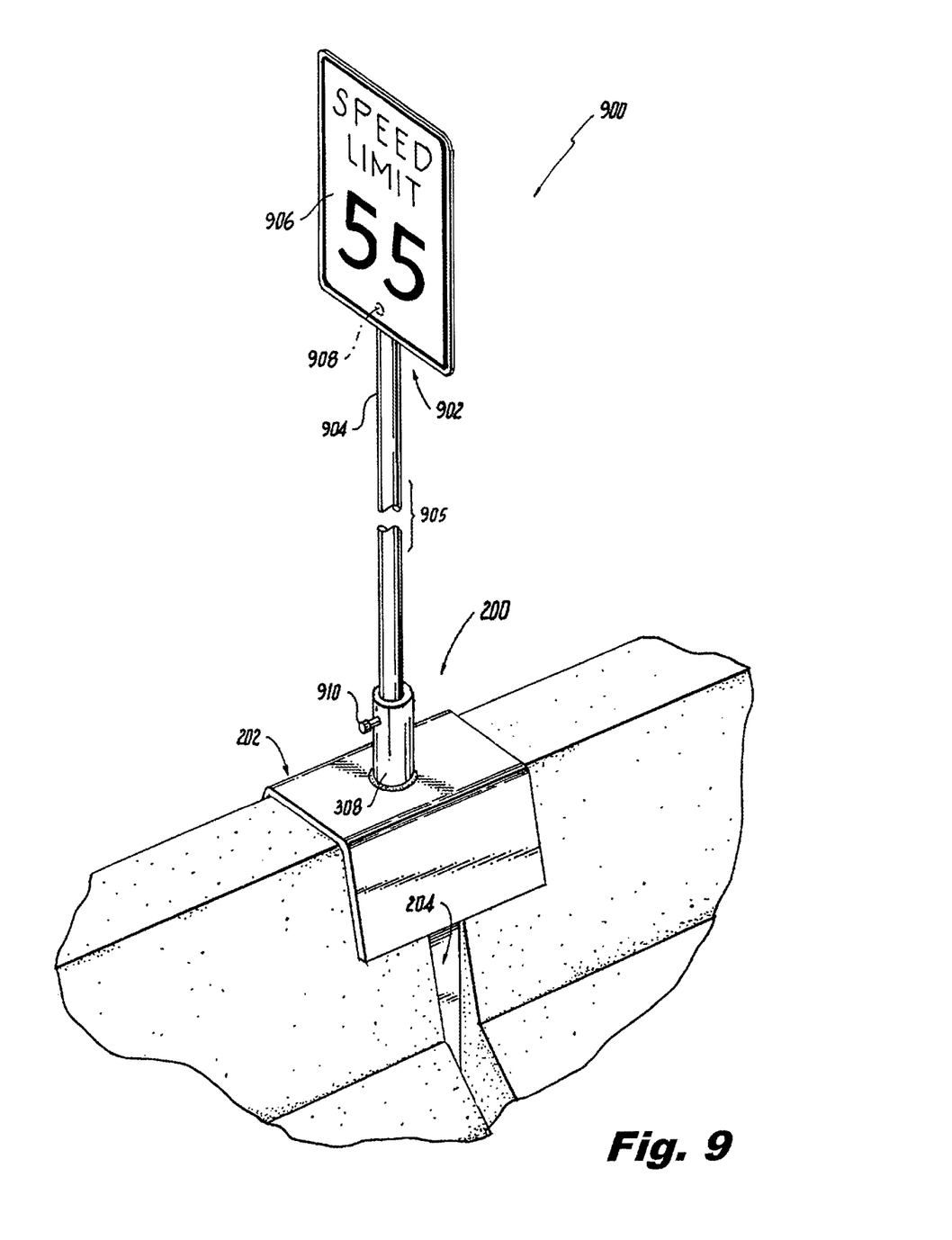
FIG. 9 illustrates a perspective view of a signage connection system that includes the connector of FIG. 2.

FIG. 9 illustrates a perspective view of a signage connection system 900. The system 900 includes a connector 200 and a signage peripheral device 902. The signage peripheral device 902 includes an extension pole 904 and a sign 906.

The extension pole 904 is sized and dimensioned to fit over the connector rod or into the connector sleeve 308. One or more connectors 910 (e.g., bolts) engage the extension pole 904 to secure the extension pole 904 in relation to the connector rod or the connector sleeve 308. Poles of different heights can be provided for various signage applications, as indicated by the break 905 along the height of extension pole 904.

The sign 906 is secured or mounted to the extension pole 904. For example, the sign can be welded at 908 to the extension pole 904. Various other connections of the sign 906 to the extension pole 904 can be provided.

It should be noted that one or more peripheral devices, such as lighting devices 702, fencing devices 802, and signage devices 902, or other peripheral devices, can be provided in various combinations along the concrete barrier system 100, which includes a multiplicity of concrete barriers and to which the peripheral devices can be connected using connectors 200.

Thus, a connector and a connection system to provide improved connection for various peripheral devices to concrete barriers have been described. Although specific example embodiments have been described, it will be evident that various modifications and changes may be made to these embodiments without departing from the broader spirit and scope of the invention.

Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments shown are described in sufficient detail to enable those skilled in the art to practice the teachings disclosed herein. Other embodiments may be utilized and derived therefrom, such that structural and logical substitutions and changes may be made without departing from the scope of this application.

The foregoing detailed description, therefore, is not to be taken in a limiting sense, and the scope of various embodiments is defined only by the appended claims, along with the full range of equivalents to which such claims are entitled.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b) and will allow the reader to quickly ascertain the nature of the technical disclosure of this application. It is submitted with the understanding that it will not be used to interpret or limit the scope or meaning of the claims.

In the foregoing detailed description, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

Moreover, it is contemplated that the features or components of various embodiments described herein can be combined into different combinations that are not explicitly enumerated in the foregoing detailed description and that such combinations can similarly stand on their own as separate example embodiments that can be claimed.

The invention claimed is:

1. A connector to slip-fit into a cross-shaped gap formed between concrete barriers, the connector comprising:
    a saddle member including a base plate and peripheral plates, the base plate having a width and a length, the peripheral plates extending at angles from the base plate to define a channel extending along the length of the base plate, the channel having an open bottom and open ends; and
    a fork member extending from the base plate of the saddle member, the fork member including an elongated base, flanges, and legs, the elongated base extending in the channel between the peripheral plates at least along the width of the base plate, the flanges being transverse to the elongated base forming a cross-shaped structure disposed in the channel with the flanges extending toward the open ends of the channel along the length of the base plate, and the legs extending separately from the elongated base through the open bottom of the channel.

2. The connector according to claim 1, wherein the peripheral plates are parallel with respect to one another.

3. The connector according to claim 1, wherein the peripheral plates are angled with respect to one another.

4. The connector according to claim 1, wherein the elongated base of the fork member includes sloping ends that mate with the peripheral plates angled with respect to the base plate of the saddle member.

5. The connector according to claim 1, wherein the saddle member further includes a sleeve to connect the connector to a peripheral device.

6. The connector according to claim 5, wherein the sleeve includes at least one opening to receive a connector to engage the peripheral device with respect to the sleeve.

7. A connection system comprising:
    concrete barriers including slots through sidewalls that terminate the concrete barriers, the sidewalls of the concrete barriers disposed in relation to each other such that a cross-shaped gap is formed between the concrete barriers, the gap defined by the sidewalls and the slots, the concrete barriers engageable by a lock extending in the gap between the concrete barriers; and
    a connector to slip-fit into the gap between the concrete barriers, the connector comprising:
        a saddle member including a base plate and peripheral plates, the base plate having a width and a length, the peripheral plates extending at angles from the base plate to define a channel extending along the length of the base plate, the channel having an open bottom and open ends; and
        a fork member extending from the base plate of the saddle member, the fork member including an elongated base, flanges, and legs, the elongated base extending in the channel between the peripheral plate at least along the width of the base plate, the flanges being transverse to the elongated base forming a cross-shaped structure disposed in the channel with the flanges extending toward the open ends of the channel along the length of the base plate, and the legs extending separately from the elongated base through the open bottom of the channel;
    wherein when the connector is slip-fit into the gap between the concrete bathers, the saddle member is disposed in relation to the concrete barriers such that the channel is disposed over the gap and partially over front walls and partially over back walls of the concrete barriers, and the fork member is disposed in relation to the concrete barriers such that the cross-shaped structure is disposed atop the lock in the cross-shaped gap between the concrete barriers and the legs straddle the lock between the sidewalls of the concrete bathers.

8. The connection system according to claim 7, wherein the peripheral plates are parallel with respect to one another.

9. The connection system according to claim 8, wherein the peripheral plates are angled with respect to one another.

10. The connection system according to claim 7, wherein the elongated base of the fork member includes sloping ends that mate with the peripheral plates angled with respect to the base plate of the saddle member.

11. The connection system according to claim 7, wherein the saddle member further includes a sleeve to connect the connector to a peripheral device.

12. The connection system according to claim 11, wherein the sleeve includes at least one opening to receive a connector to engage the peripheral device with respect to the sleeve.

13. The connection system according to claim 7, further comprising a peripheral device.

14. The connection system according to claim 13, wherein the peripheral device is one of a light device, a sign device, or a fence device.

15. The connection system according to claim 13, wherein the peripheral device comprises:
    an extension pole; and
    a device that extends in relation to the extension pole.

16. The connection system according to claim 15, wherein the device is one of a light fixture, a sign, or a fence.

* * * * *